United States Patent
Liu et al.

(10) Patent No.: US 9,163,323 B2
(45) Date of Patent: Oct. 20, 2015

(54) VIBRATION FEEDING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Lin-Jun Liu, Shenzhen (CN); Wen-Li Wang, Shenzhen (CN); Tian-Feng Huang, Shenzhen (CN); Zhen-Dong Wei, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 279 days.

(21) Appl. No.: 13/865,195

(22) Filed: Apr. 18, 2013

(65) Prior Publication Data

US 2013/0284592 A1  Oct. 31, 2013

(30) Foreign Application Priority Data

Apr. 25, 2012 (CN) .......................... 2012 1 0122139

(51) Int. Cl.
*C25F 7/00* (2006.01)
*B23H 7/30* (2006.01)
*B23H 3/00* (2006.01)

(52) U.S. Cl.
CPC .. *C25F 7/00* (2013.01); *B23H 7/30* (2013.01); *B23H 3/00* (2013.01)

(58) Field of Classification Search
CPC ... B23H 7/30; B23H 2400/10; B23H 2400/00
USPC .................................. 204/222, 225; 205/686
See application file for complete search history.

(56) References Cited

U.S. PATENT DOCUMENTS

| 3,326,792 | A | * | 6/1967 | Snodderly, Jr. et al. ...... 204/222 |
| 4,430,544 | A | * | 2/1984 | Inoue ........................... 219/69.2 |
| 2005/0109634 | A1 | * | 5/2005 | Mielke ........................ 205/686 |

* cited by examiner

*Primary Examiner* — Nicholas A Smith
*Assistant Examiner* — Brian W Cohen
(74) *Attorney, Agent, or Firm* — Novak Druce Connolly Bove + Quigg LLP

(57) ABSTRACT

A vibration feeding device includes a mounting seat, a vibration feeding mechanism, and a pressing mechanism. The vibration feeding mechanism includes a driving member, a rotating shaft, a rotation wheel, and at least one adjusting member. The rotating shaft is rotatably connected to the driving member. The rotation wheel is non-rotatably sleeved on the rotating shaft. The at least one adjusting member is fixed between the rotating shaft and the rotation wheel to adjust an eccentricity of the rotation wheel. The vibration feeding mechanism is mounted on the mounting seat. The pressing mechanism is connected to the rotation wheel of the vibration feeding mechanism and is driven by the vibration to adjustably move close to and then away from a workpiece.

13 Claims, 5 Drawing Sheets

VIBRATION FEEDING DEVICE

BACKGROUND

1. Technical Field

The present disclosure generally relates to vibration feeding devices, and particularly to a vibration feeding device used in an electrochemical machining.

2. Description of Related Art

Electrochemical machining (ECM) is a method of removing metal by an electrochemical process. Electrochemical machining equipment used for machining small holes in a workpiece includes a vibration feeding device and an electrode connected to the vibration feeding device. Typically, the vibration feeding device includes a mounting seat, a cam, and a pressing rod. The rotation wheel and the pressing rod are movably assembled on the mounting seat. One end of the pressing rod is connected to the rotation wheel, and the other end of the pressing rod is connected to the electrode. The electrode is driven by the cam via the pressing rod to move towards the workpiece. However, a size of the cam is constant, and a vibration amplitude of the electrode determined by the cam is accordingly constant, thereby a depth of the hole machined by the electrochemical machining equipment cannot be adjusted.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
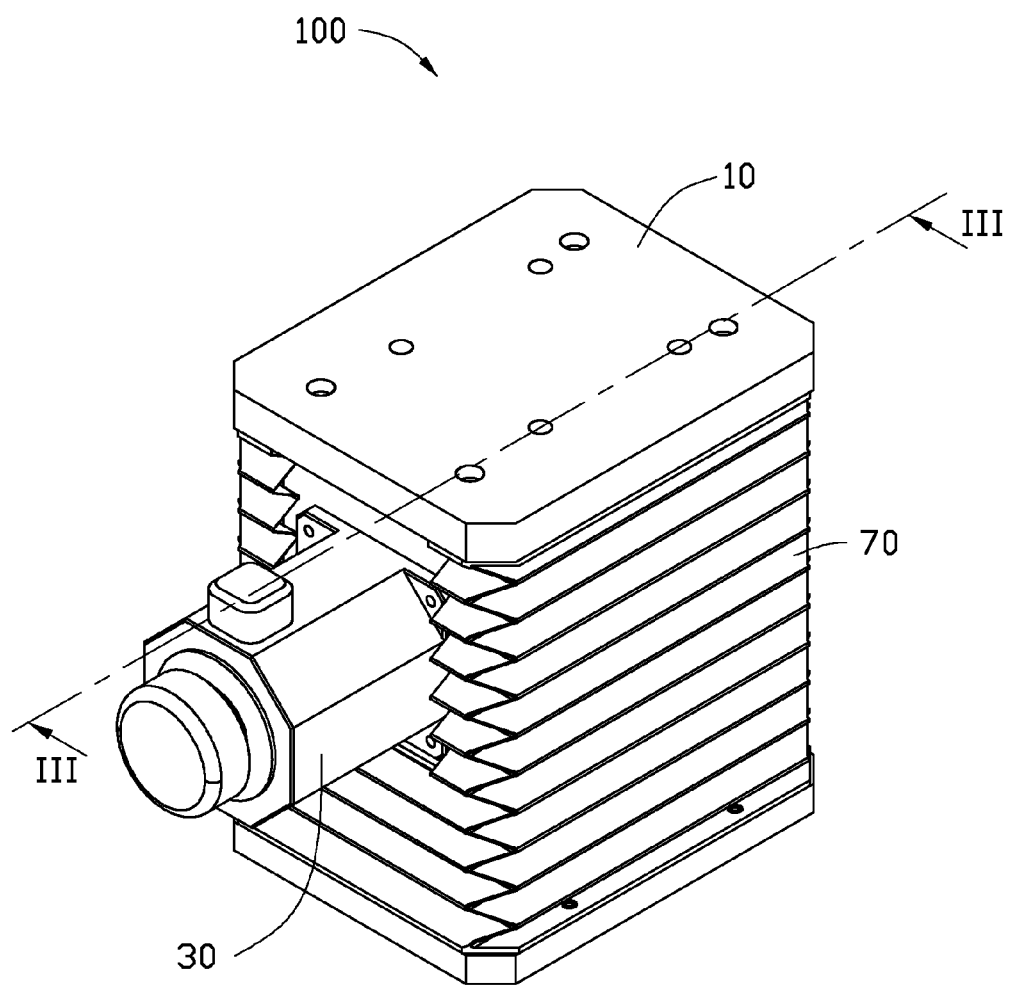
FIG. 1 is an assembled, isometric view of an embodiment of a vibration feeding device including a vibration feeding mechanism.
Figure 2:
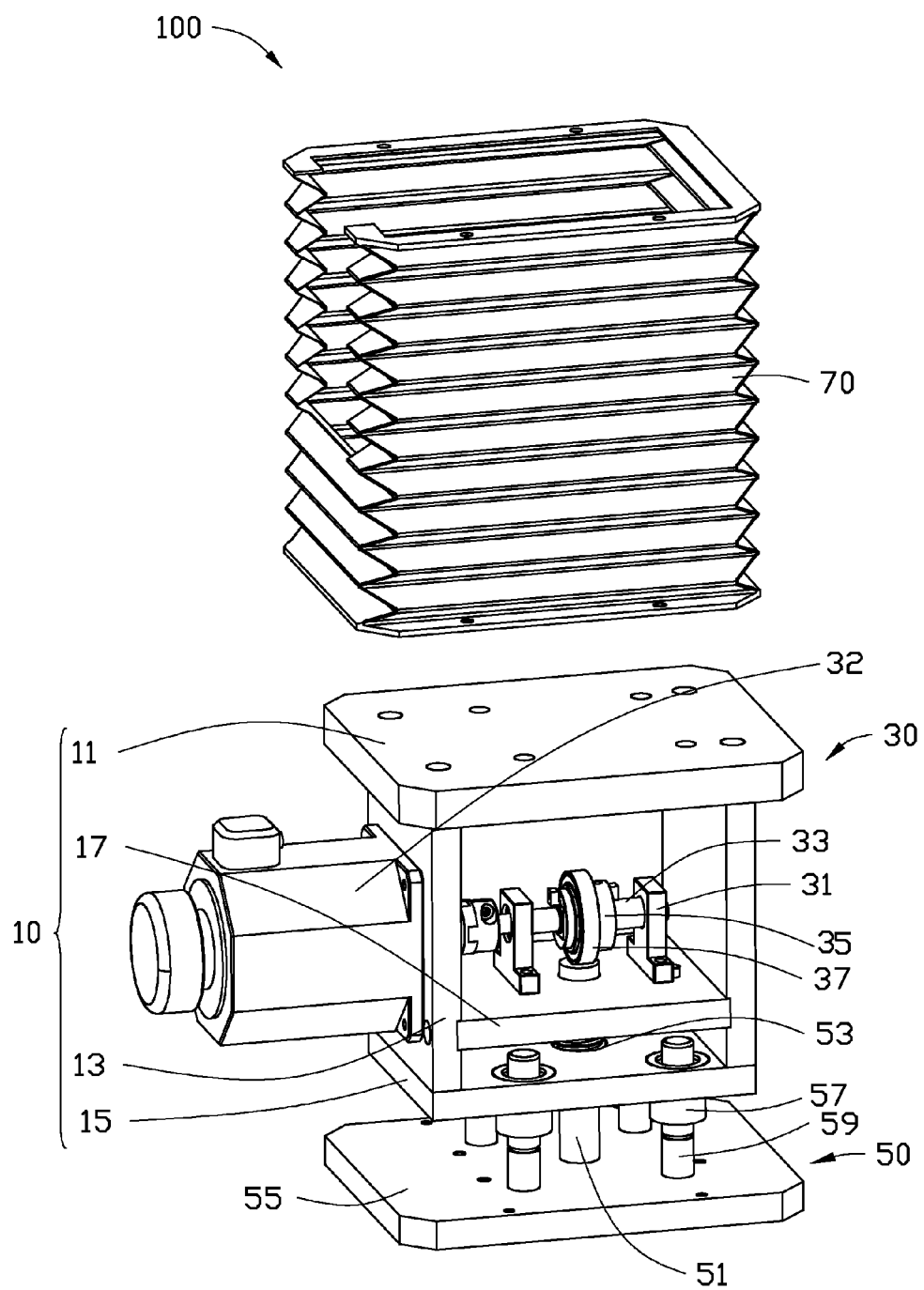
FIG. 2 is a partial, exploded, isometric view of the vibration feeding device of FIG. 1.

Referring to FIGS. 1 and 2, an embodiment of a vibration feeding device 100 is shown. The vibration feeding device 100 drives an electrode (not shown) to move towards and away from a workpiece (not shown), to machine the workpiece in an electrochemical machining process. The vibration feeding device 100 includes a mounting seat 10, a vibration feeding mechanism 30, a pressing mechanism 50, and a shielding cover 70. The vibration feeding mechanism 30 and the pressing mechanism 50 are both assembled on the mounting seat 10, and the shielding cover 70 is sleeved on the mounting seat 10 to cover the vibration feeding mechanism 30 and the pressing mechanism 50.

Figure 3:
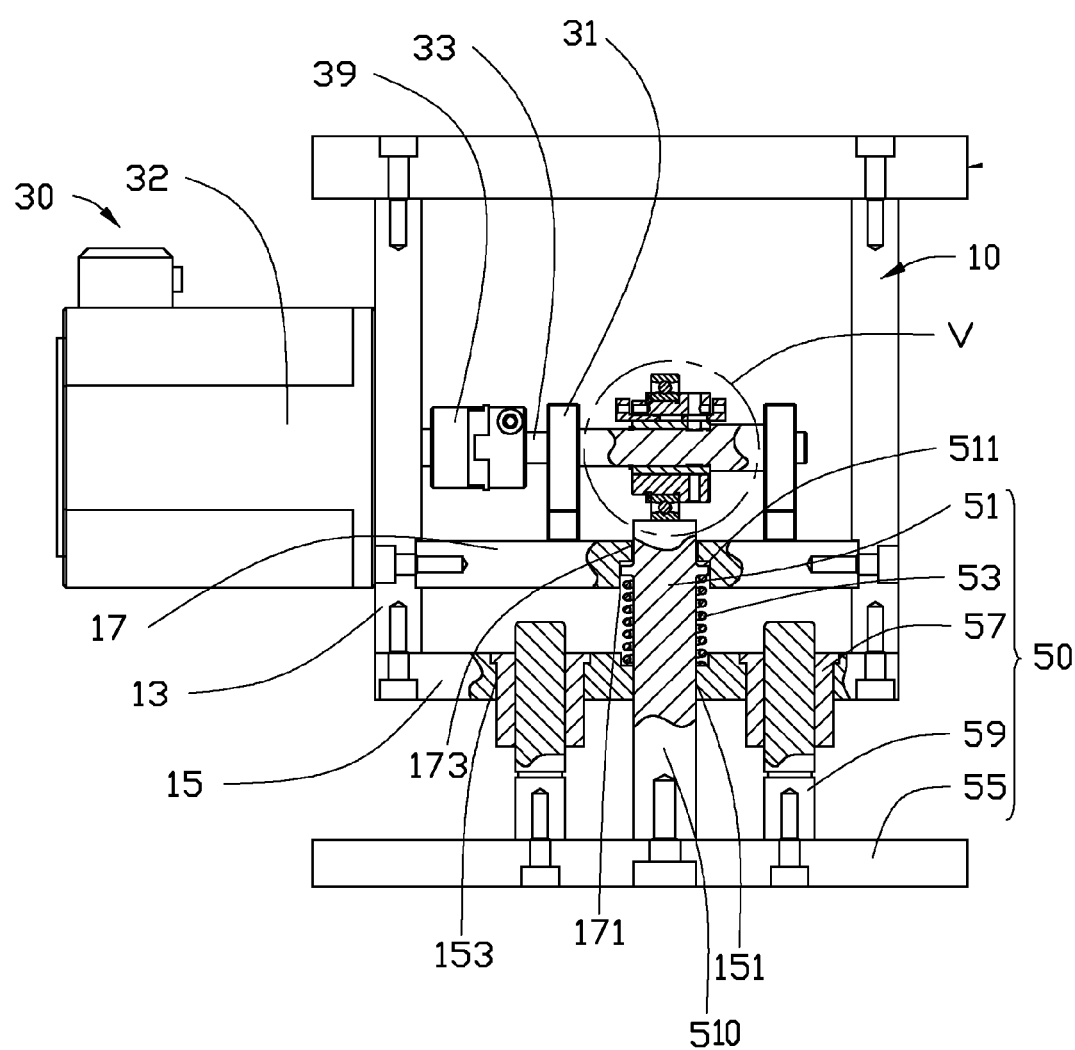
FIG. 3 is a cross-sectional view of the vibration feeding device of FIG. 1, taken along the line III-III.

Referring also to FIG. 3, the mounting seat 10 is substantially a rectangular frame. The mounting seat 10 includes a top board 11, two side boards 13, a bottom board 15, and a supporting board 17. The top board 11, the two side boards 13, and the bottom board 15 cooperatively define a rectangular frame. The top board 11 is parallel to the bottom board 15. The two side boards 13 are parallel to each other. The supporting board 17 is fixed to the two side boards 13. The supporting board 17 is located between the top board 11 and the bottom board 15, and is parallel to the bottom board 15. The bottom board 15 defines a stepped hole 151 and four fixing holes 153 surrounding the stepped hole 151. The supporting board 17 defines a restricting groove 171 in a side surface of the supporting board 17 adjacent to the bottom board 15. The supporting board 17 further defines a through hole 173 in a bottom surface of the restricting groove 171 communicating with the restricting groove 171.

Figure 4:
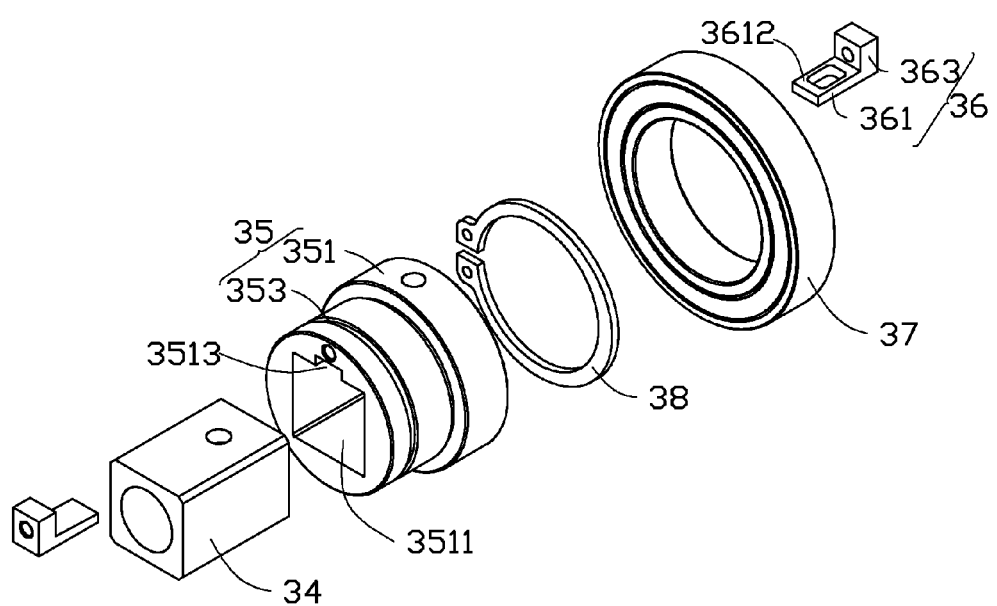
FIG. 4 is a partial, exploded, isometric view of the vibration feeding mechanism of FIG. 1.
Figure 5:
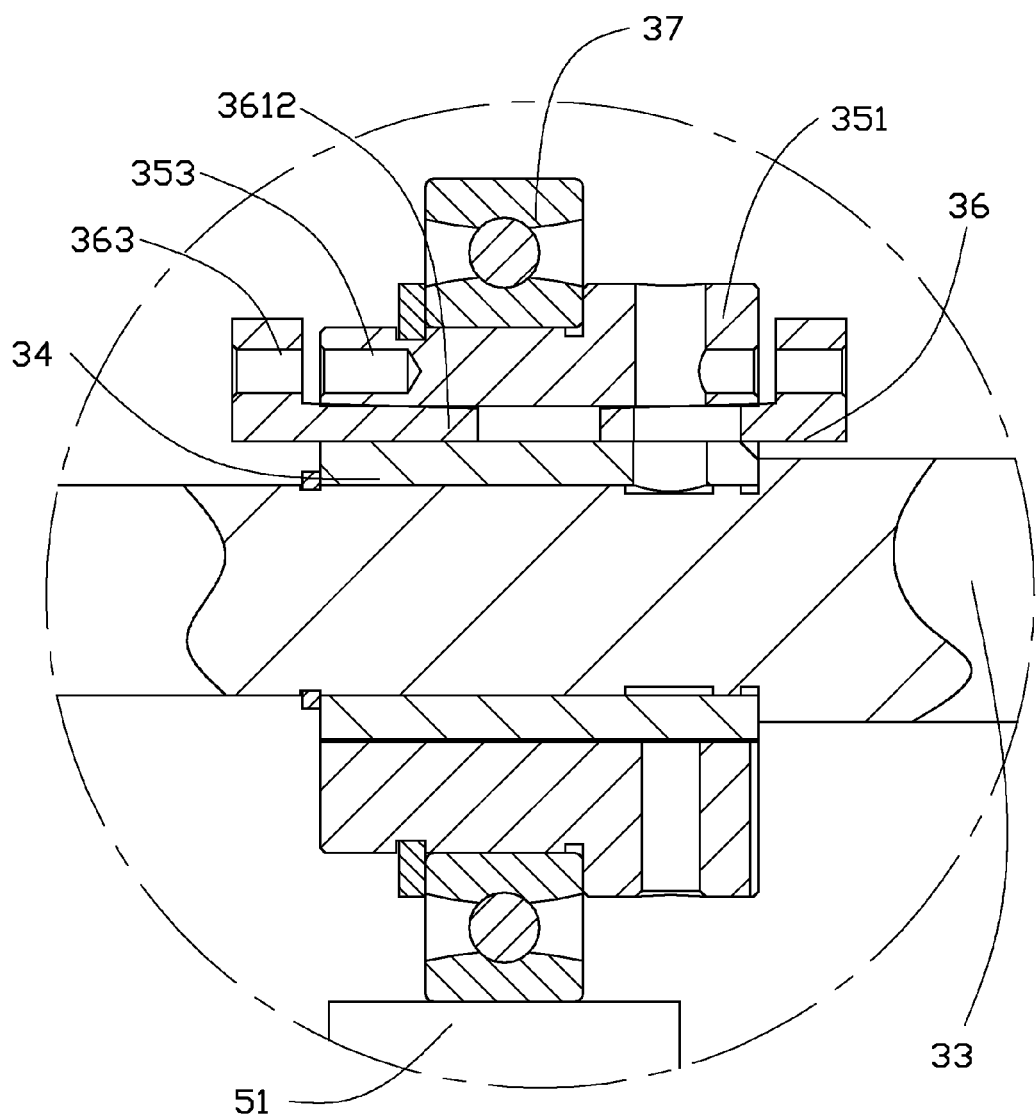
FIG. 5 is an enlarged view of a circled portion V of FIG. 3.

Referring also to FIGS. 4 and 5, the vibration feeding mechanism 30 includes two bearing seats 31, a driving member 32, a driving shaft 33, a fixing member 34, a rotation wheel 35, two adjusting members 36, a bearing 37, a snap ring 38, and a coupling 39.

The two bearing seats 31 are fixed on the supporting board 17 and are located at opposite sides of the through hole 173. In the illustrated embodiment, the driving member 32 is a motor. The driving member 32 is fixed on an outer surface of one of the two side boards 13. The driving shaft 33 passes through the two bearing seats 31 with one end of the driving shaft 33 rotatably connected to the driving member 32 by the coupling 39. The fixing member 34 is substantially a rectangular block. The fixing member 34 is non-rotatably sleeved on the driving shaft 33 and is located between the two bearing seats 31.

The rotation wheel 35 is non-rotatably sleeved on the fixing member 34. In the illustrated embodiment, the rotation wheel 35 is an eccentric wheel. The rotation wheel 35 includes a base portion 353 and a flange 351 protruding out of an outer surface of the base portion 353 at an end thereof. The rotation wheel 35 axially defines a locating hole 3511 and an adjusting groove 3513 in an inner surface of the locating hole 3511.

The two adjusting members 36 are fixed in opposite ends of the adjusting groove 3513 between the rotation wheel 35 and the fixing member 34, to adjust the eccentricity of the rotation wheel 35 and thereby to adjust a vibration amplitude of the vibration feeding mechanism 30. In the illustrated embodiment, each adjusting member 36 is L-shaped. Each of the two adjusting members 36 includes an adjusting portion 361 and a fixing portion 363 formed at an end of the adjusting portion 361. The adjusting portion 361 is wedge-shaped. The adjusting portion 361 defines a slanted surface 3612, and a thickness of the adjusting portion 361 gradually increases from one end of the adjusting portion 361 towards the other end of the adjusting portion 361 which is adjacent to the fixing portion 363. The adjusting portion 361 is adjustably received in the adjusting groove 3513 for adjusting the eccentricity of the rotation wheel 35. The number of adjusting members 36 can be one, or three, or more.

In the illustrated embodiment, the bearing 37 is a roller bearing, and the latching ring 38 is an elastic C-shaped ring. The bearing 37 is non-rotatably sleeved on the base portion 353 of the rotation wheel 35. The latching ring 38 is fixed on an end of the base portion 353 away from the flange 351 to fix the bearing 37 to the base portion 353 of the rotation wheel 35.

The pressing mechanism 50 includes a pressing rod 51, an elastic member 53, a fixing board 55, four guiding sleeves 57, and four guiding rods 59. The pressing rod 51 includes a main body 510 and a resisting portion 511 radially protruding out from an end of the main body 510. The main body 510 of the pressing rod 51 passes through the stepped hole 151 and the through hole 173 with the resisting portion 511 being received in the restricting hole 171. One end of the main body 510 is non-rotatably fixed to the bearing 37 and the other end of the main body 510 is fixed to the fixing board 55. In the illustrated embodiment, the elastic member 53 is a spring. The elastic member 53 is sleeved on main body 510 of the pressing rod 51 with one end of the elastic member 53 received in the restricting hole 171 and the other end of the elastic member 53 received in stepped hole 151. One end of the elastic member 53 resists against the resisting portion 511 of the pressing rod 51, and the other end of the elastic member 53 resists against the bottom board 15. The four guiding sleeves 57 are fixed in the four fixing holes 153. Each of the four guiding rods 59 is slidably sleeved in one guiding sleeve 57. One end of each of the four guiding rods 59 furthest from the bottom board 17 is fixed on the fixing board 55. The electrode is fixed to a surface of the fixing board 55 furthest from the mounting seat 10.

In the illustrated embodiment, the shielding cover 70 is flexible and is sleeved on the mounting seat 10. That is to say, the shielding cover 70 is capable of expansion and contraction. One end of the shielding cover 70 is fixed to the top board 11, the other end of the shielding cover 70 is fixed to the fixing board 55. In an alternative embodiment, the shielding cover 70 can be omitted.

In use, the workpiece is loaded below the vibration feeding device 100 and is electrically connected to an anode (not shown). The electrode fixed to the fixing board 55 is electrically connected to a cathode (not shown). The driving member 32 rotates the driving shaft 33, and the rotation wheel 35 is thus rotated. At this time, the rotation wheel 35 drives the bearing 37 to move with the rotation of the rotation wheel 35. During the rotation of the rotation wheel 35, as the most outwardly eccentric point on the periphery changes to the most inwardly eccentric point, the bearing 37 moves towards the workpiece. Conversely, as the most inwardly eccentric point on the periphery rotates onwards and gives way to the most outwardly eccentric point, the bearing 37 moves away from the workpiece. Thus, the bearing 37 drives the pressing rod 51 to move towards and then away from the workpiece. When the pressing rod 51 is driven by the rotation wheel 35 to move towards the workpiece, the elastic member 53 is compressed. When the pressing rod 51 is driven by the rotation wheel 35 to move away from the workpiece, the elastic member 53 partially restores. Thus, the vibration provides the movement of the pressing rod 51 towards or away from the workpiece. The pressing rod 51 drives the electrode to approach and then retreat from the workpiece.

The eccentricity of the rotation wheel 35 can be adjusted by changing a length of each of the two adjusting members 36 received in the adjusting groove 3513, and thereby adjusting a vibration amplitude. It is convenient for the vibration feeding device 100 to machine holes with different depths in different workpieces. Alternatively, the vibration feeding device 100 can be also used for machining a groove, or cutting microscopic lengths of a workpiece, which depends on the electrode fixed to the fixing board 55.

In an alternative embodiment, the fixing member 34 can be omitted, and the rotation wheel 35 be fixed on the rotating shaft 33.

In an alternative embodiment, the coupling 39 can be omitted, and the rotating shaft 33 be rotatably connected to the driving member 32.

In an alternative embodiment, the fixing board 55, the four guiding sleeves 57, and the four guiding rods 59 can be omitted, and the electrode be fixed to an end of the pressing rod 51 furthest from the bearing 37.

In an alternative embodiment, the bearing 37 can be omitted, and the pressing rod 51 be rotatably connected to the rotation wheel 35.

In alternative embodiments, the elastic member 53 can be an elastic piece fixed between the fixing board 55 and the supporting board 17 and pre-loaded adjacent to the pressing rod 51, or the pressing rod 51 and the elastic member 53 can together be replaced by an elastic pressing rod 51.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A vibration feeding device, comprising:
   an electrode;
   a mounting seat;
   a vibration feeding mechanism mounted on the mounting seat, the vibration feeding mechanism comprising a driving member, a rotation shaft rotatably connected to the driving member, a rotation wheel non-rotatably sleeved on the rotating shaft at least one adjusting member fixed between the rotating shaft and the rotation wheel to adjust an eccentricity of the rotation wheel; and
   a pressing mechanism connected to the rotation wheel of the vibration feeding mechanism and capable of moving relative to the mounting seat driven by the rotation wheel and configured to drive the electrode fixed thereon to approach and retreat from a workpiece.

2. The vibration feeding device of claim 1, wherein the at least one adjusting member is L-shaped, the at least one adjusting member comprises an adjusting portion and a fixing portion formed at an end of the adjusting portion, the adjusting portion is wedge-shaped for adjusting the eccentricity of the rotation wheel, the rotation wheel axially defines a locating hole and an adjusting groove in an inner surface of the locating hole, the rotation wheel is sleeved on the rotating shaft via the locating hole, and the adjusting portion is adjustably received in the adjusting groove for adjusting an eccentricity of the rotation wheel.

3. The vibration feeding device of claim 2, wherein the vibration feeding mechanism further comprises a fixing member non-rotatably sleeved on the driving shaft, and the rotation wheel is non-rotatably sleeved on the fixing member.

4. The vibration feeding device of claim 1, wherein the vibration feeding mechanism further comprises a coupling, and the driving shaft is rotatably connected to the driving member by the coupling.

5. The vibration feeding device of claim 1, wherein the pressing mechanism comprises a pressing rod and an elastic member sleeved on the pressing rod, and an end of the pressing rod is rotatably connected to the rotation wheel.

6. The vibration feeding device of claim 5, wherein the vibration feeding mechanism further comprises a bearing non-rotatably sleeved on the rotation wheel, and the end of the pressing rod is non-rotatably fixed to the bearing.

7. The vibration feeding device of claim 6, wherein the rotation wheel comprises a base portion and a flange protruding out of an outer surface of the base portion at an end of the base portion, the vibration feeding mechanism further comprises a latching ring, the bearing is non-rotatably sleeved on the base portion of the rotation wheel, and the latching ring is fixed on an end of the base portion away from the flange to fix the bearing.

8. The vibration feeding device of claim 7, wherein the vibration feeding mechanism further comprises at least one bearing seat loaded on the mounting seat, and the rotating shaft passes through the at least one bearing seat.

9. The vibration feeding device of claim 8, wherein the mounting seat comprises a top board, two side boards, a bottom board, and a supporting board, the top board, the two side boards, and the bottom board cooperatively define a rectangular frame, the supporting board is fixed to the two side boards and is located between the top board and the bottom board, and the at least one bearing seat is loaded on the supporting board.

10. The vibration feeding device of claim 9, wherein the supporting board defines a restricting groove in a side surface of the supporting board adjacent to the bottom board and a through hole in the bottom of the restricting groove communicating with the restricting groove, the bottom board defines a stepped hole, the pressing rod comprises a main body and a resisting portion radially protruding out from the end of the main body adjacent to the rotation wheel, and the main body passes through the stepped hole and the through hole with the resisting portion received in the restricting hole.

11. The vibration feeding device of claim 10, wherein one end of the elastic member received in the restricting hole and the other end of the elastic member received in the stepped hole, and one end of the elastic member resists with resisting portion of the pressing rod and the other end of the elastic member resists with the bottom board.

12. The vibration feeding device of claim 11, wherein the pressing mechanism further comprises a fixing board, four guiding sleeves, and four guiding rods, the bottom board further defines four fixing holes surrounding the stepped hole, the four guiding sleeves are fixed in the four fixing holes, each of the four guiding rods is slidably sleeved in one guiding sleeve, and one end of each of the four guiding rods away from the bottom board is fixed to the fixing board, and the fixing board is configured to fix the electrode thereon.

13. The vibration feeding device of claim 1, wherein the rotation wheel is an eccentric wheel.

* * * * *